United States Patent Office 3,264,087
Patented August 2, 1966

3,264,087
**LIQUID FERTILIZER FROM BATCHWISE AMMO-
NIATION OF WET-PROCESS PHOSPHORIC ACID**
Archie V. Slack and Donald W. Rindt, Sheffield, Ala.,
assignors to Tennessee Valley Authority, a corporation
of the United States
Filed June 24, 1963, Ser. No. 290,266
3 Claims. (Cl. 71—43)

The invention herein described may be manufactured and used by or for the Government for governmental purposes without the payment to us of any royalty therefor.

Our invention relates to an improved process in the production of liquid fertilizers from wet-process phosphoric acid and ammonia, and more particularly it is especially concerned with improvements in processes for the removal of impurities containing iron, aluminum, and calcium from acid of this type.

Wet-process phosphoric acid is very impure. Since it is ordinarily prepared by treating phosphate rock with dilute sulfuric acid, it may contain any acid soluble impurities present in the rock and these may vary widely in both composition and amount. For example, a wet-process phosphoric acid ordinarily may be expected to contain about 27 to 28 percent $P_2O_5$, 2.5 to 3.0 percent $SO_3$, 2 to 3 percent fluorine, 1.25 to 1.75 percent $Fe_2O_3$, 1.25 to 1.6 percent alumina, 0.25 to 0.4 percent calcium oxide, and about 50 to 55 percent water. These proportions are quite variable, however, and the quantities of impurities may vary rather widely from those set out above.

Although electric furnace phosphoric acid is now normally used in the production of liquid mixed fertilizers because it gives a clear product, wet-process phosphoric acid is less expensive in most areas and therefore would be a very economically desirable starting constituent for the production of such liquid mixed fertilizers. However, the impurities mentioned above present in the wet-process phosphoric acid precipitate when such wet acid is neutralized and often cause trouble in storing and applying the product. It is possible to ammoniate wet-process phosphoric acid, however, without precipitation of the impurities by a number of processes described in the prior art. In some of these earlier publications, TVA has described (1) the production of clear liquid fertilizers from wet-process acid through the addition of superphosphoric acid which contains polyphosphates to sequester the impurities that normally precipitate on ammoniation. (J. Agr. Food Chem. 9, 174–8 (1961)) and (2) methods for keeping the precipitated impurities suspended in the liquid fertilizers in a finely divided form so that no difficulties are encountered with settling or clogging of lines and spray nozzles as described by Slack et al. (J. Agr. Food Chem. 9, 343–8 (1961)). In this first approach polyphosphates such as those in superphosphoric acid are the usual sequestrants and when these are added to wet-process acid they prevent precipitation due to ammoniation. This first approach is also generally described in U.S. Patents 3,015,552, Striplin et al., and 3,057,711, Wilson et al. However, superphosphoric acid or, as in the Striplin reference, the ammoniated salts of superphosphoric acid are relatively expensive and may not be readily available for use in sequestering the impurities in wet-process phosphoric acid.

Heretofore liquid mixed fertilizers having compositions similar to those of standard dry fertliizers have been well known and such fertilizers are increasing in popularity in the industry. Such solutions have numerous advantages over dry mixed fertilizers. The costs of evaporating moisture and the bagging oepration are eliminated. Such liquid fertilizers greatly simplify the operation of applying plant nutrients to the soil. Moreover, the use of liquid fertilizers effectively eliminates difficulties due to segregation and caking often encountered in storing dry fertilizers.

However, liquid fertilizers have in the past had some outstanding disadvantages. As mentioned above, with reference to the processes disclosed in Striplin et al, and Wilson et al., the raw material costs have proved to be relatively high and in many instances unavailable to fertilizer processors who have readily available access to wet-process phosphoric acid of either "filter grade," about 26–30 percent $P_2O_5$) or the slightly more concentrated product normally shipped and referred to as "merchant grade" product (about 52–54 percent $P_2O_5$). The liquid fertilizer solutions produced from wet-process phosphoric acid by other prior-art methods, wherein the more expensive sequestering agents have not been used, have been limited in that the formation of the precipitate from the impurities in the wet acid has required the utilization of extensive settling and filtration equipment, thereby greatly increasing the initial cost of the processing unit which necessarily must be passed on to the consumer in the form of a higher unit cost of $P_2O_5$. The desirability of removing such precipitated impurities by the use of such extensive settling and filtration equipment is well recognized in the fertilizer industry inasmuch as liquid fertilizers containing such precipitated impurities require special equipment to ensure that the precipitated materials remain in a form of a pseudo suspension by means of agitation during storage and application to the soil. Furthermore, if such precipitated impurities are allowed to settle out during either storage or handling, it becomes difficult to pump the fertilizer and such precipitated impurities plug small discharge orifices in the equipment used in applying the liquid fertilizer to the soil so as to preclude its use on a practical basis.

These disadvantages often outweigh the benefits derived from elimination of the evaporation and bagging steps involved in the preparation of conventional dry mixed fertilizer.

Our invention is directed to an improved process for producing a liquid mixed fertilizer directly from the ammonation of commercially available wet-process phosphoric acid which process does not require the use of more costly sequestering agents such as ammonium salts of polyphosphoric acids and which process is characterized by the ease of handling and separation of the precipitated impurities normally associated with commercially available wet-process phosphoric acid.

We have found that liquid mixed fertilizers of the type described may be produced by our process which involves removal of the precipitated impurities by filtration or decantation. Two products result from this type of operation: a clear liquid fertilizer and a filter cake or slurry that contains considerable portions of plant nutrients. The cake or slurry might be sold directly as a fertilizer or used in the production of solid or salt suspension fertilizers. Our chief objectives in arriving at our improved process were to obtain the optimum conditions of operation for ammoniating wet-process phosphoric acid, which would give the highest rates of filtration of ammoniated wet-process phosphoric acid and also, at the same time, the highest rates of settling. In U.S. Patent 2,891,856, Getsinger et al., some data of this type were obtained in earlier work by TVA on the production of diammonium phosphate from wet-process acid by a crystallization process.

In the work of Getsinger it was necessary to remove most of the precipitated impurities, such as iron, alumina, fluorine, and silica, from partially ammoniated acid to prevent precipitation in an "unfilterable" form when fully ammoniated. High pH and high ammoniation rates (which might cause localized high pH) resulted in fine precipitates and gel formation. However, Getsinger et al. found that ammoniation of wet-process acid to a pH of 5 at a rate from about 5 to 15 pounds of ammonia per hour per cubic foot of acid (24 percent $P_2O_5$ filter-grade acid from TVA pilot plant) resulted in a precipitation of most of the aluminum and iron in a form that settled and could be filtered.

In our process, we do not incorporate the use of sequestering agents as described in prior-art processes and, furthermore, our process does not require the use of extensive installations of settling tanks and filtering means. Our process is based in part on the discovery that there is a "critical range" during which the ammoniation of the wet-process phosphoric acid must be carefully controlled and during ammoniation through this critical range of pH the rate of ammoniation and also the temperature of the acid being ammoniated must be carefully controlled. Our process may be carried out batchwise, continuous, or a combination of the two, and we have found that the "critical range" for the batchwise ammoniation is shifted so that its upper limit is adjacent to the lower limit of the critical range for continuous ammoniation of the wet acid. In addition, in the batchwise ammoniation our process may be carried out in either a batch-successive or a batch-simultaneous manner.

For the sake of clarity and to more clearly set forth the concepts underlying our invention, we set forth the following brief descriptions of both the batchwise and the continuous ammoniation operation.

BATCHWISE AMMONIATION

Batch ammoniation may be divided into two types: (1) batch-successive, in which the acid and ammonia are added to the reactor consecutively, and (2) batch-simultaneous, in which the acid and ammonia are added simultaneously until all the acid has been introduced and the remainder of the ammonia then added. In both types of ammoniation it is mandatory that the ammoniation rates and solution temperatures in the critical range be controlled accurately.

Wet-process phosphoric acid is produced as "filter-grade" product (about 26–30 percent $P_2O_5$) and is concentrated to "merchant-grade" product (about 52–54 percent $P_2O_5$) by the evaporation of water. In this evaporation, an appreciable portion of the impurities in the acid is precipitated incidentally and removed. Thus, the filter-grade acid has a greater impurity content and is more difficult to use. However, both acids can be used in the present process. Either grade should be diluted to a $P_2O_5$ concentration of about 24 to 28 percent preferably about 26 percent for best results. The dilution can be carried out by prediluting the acid to the desired concentration or by adding the required amount of water to the reactor before feeding acid and ammonia. The latter assures full use of the heat of acid dilution in reaching the high temperatures desirable in the process.

For batch-successive ammoniation, the acid is charged to the reactor and gaseous ammonia introduced through spargers. Normally the exothermic reaction will raise the temperature of the solution so that at pH 2.5 the temperature will be near boiling (215° F. to 222° F.); preheating the acid or other heating methods can be used to assure this temperature level, which is beneficial to the process. The initial precipitation from filter-grade acid occurs at about pH 2.5 and from merchant grade at about pH 2.7. Up to this pH the ammonia can be added rapidly. At the start of the critical range, however, the rate must be reduced and held low throughout the critical range to assure a granular precipitate that will separate readily. The proper rate depends on the balance desired between filtration rate and time required to make the batch; a rate of 5 pounds or less per hour per cubic foot of solution probably gives acceptable filtration. After the critical range, beyond pH 4.2, the ammoniation rate may be increased as desired. To assure rapid filtration of the slurry product the temperature should be near boiling.

In batch-simultaneous ammoniation, the acid and gaseous ammonia are fed to the reactor simultaneously and the pH of the solution is maintained below the critical range. When all the acid has been introduced, the pH is raised to 2.5 and the solution temperature raised, if necessary, to boiling or almost boiling (215° F. to 222° F.). The ammoniation rate is then held at a low level through the critical range and increased to a relatively high level after the critical range is passed.

CONTINUOUS AMMONIATION AND DECANTATION

Wet-process phosphoric acid is diluted to contain 24 to 28 percent $P_2O_5$, preferably about 26 percent. The acid is fed continuously (FIGURE 2), along the gaseous ammonia, into the first-stage reactor. Operating conditions in this reactor are critical; the (1) ammoniation rate, (2) temperature, and (3) pH should be controlled closely. The ammoniation rate should be less than about 20 pounds of ammonia per hour per cubic foot, the temperature should be at or near boiling (about 218° F.), and the pH should be at an optimum which is normally in the range 4.0 to 4.2. The first-stage reactor overflows into the second-stage reactor where the final ammoniation is accomplished by adding more gaseous ammonia. The temperature in the second stage should be at or near boiling and the pH value adjusted for the desired product; the ammoniation rate in this stage is not critical. The slurry produced by ammoniation overflows from the second reactor to the feed line and into the continuous decanter. The feed enters the decanter below the liquid surface at a point above which the liquid volume is 75 percent of the total working volume (volume occupied by liquid at steady-state operation). The ratio of volume of feed per hour to decanter working volume should be about 1:1; such a ratio is satisfactory for the described ammoniated products. The clear liquid product overflows from the top and the slurry coproduct flows from the bottom. A satisfactory ratio of product to coproduct, in terms of volume, has been 75 percent clear liquid and 25 percent slurry.

Under the conditions described, clear 8–24–0 liquid fertilizer has been produced. The coproduct slurry was also an 8–24–0 grade.

Furthermore, several new and advantageous features over the conventional processes for preparing liquid mixed fertilizers from ammoniation of wet-process phosphoric acid are realized by the present invention.

Among these advantageous features are: a simple and inexpensive process for preparing liquid mixed fertilizers utilizing one of the cheapest of fertilizer raw materials, filter-grade wet-process phosphoric acid, a process wherein the utilization of relatively high-cost sequestering agents such as the ammonium polyphosphate salts of superphosphoric acid are not required, and a process wherein the physical requirements for settling and filtering means are minimized.

It is therefore an object of the present invention to provide an improved process for producing fertilizers from wet-process phosphoric acid and ammonia.

A further object of the present invention is to provide an improved process for precipitating impurities containing iron, aluminum, and calcium from wet-process phosphoric acid in a nongelatinous and easily separable form.

A still further object of the present invention is to provide a process for the manufacture of fertilizers from wet-process phosphoric acid in which both the resulting purified acid and the precipitated impurities may be utilized as fertilizer constituents.

A still further object of the present invention is to provide a method of precipitating impurities containing iron, aluminum, and calcium from wet-process phosphoric acid which results in an acidic solution which, upon subsequent ammoniation, may be utilized as a liquid mixed fertilizer.

Still further and more general objects and advantages of the present invention will appear from the more detailed description set forth below, it being understood, however, that this more detailed description is given by way of illustration and explanation only and not by way of limitations since various changes may be made by those skilled in the art without departing from the spirit and scope of the present invention.

Our invention, together with further objects and advantages thereof, will be better understood from a consideration of the following description taken in connection with the accompanying drawings and figures in which.

Figure 1:
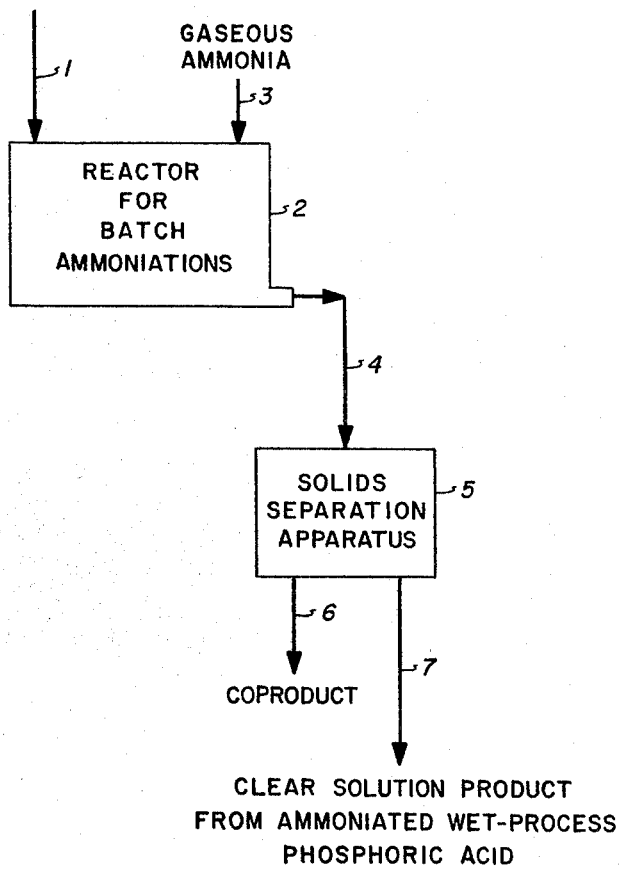
FIGURE 1 is a flowsheet generally illustrating the principles of our process which results in the liquid mixed fertilizers having the novel properties mentioned above prepared by the batch-ammoniation process.

Referring now more specifically to FIGURE 1, wet-process phosphoric acid from a source not shown is led via line 1 into reactor 2 for batch ammoniation. Gaseous ammonia from a source not shown is fed via line 3 into reactor 2, either simultaneously with wet-process phosphoric acid via line 1 or subsequently to the introduction of wet-process phosphoric acid, depending on whether the batch-simultaneous or the batch-successive method is employed, respectively. This form of the process is based on the fact that practically all of the impurities can be precipitated in the narrow pH range of 2.5 to 4.2 termed the "critical range." Thus, the acid in reactor 2 may be rapidly ammoniated up to a pH of about 2.5 and then slowly ammoniated through the critical range of 2.5 to about 4.2 such that the impurities precipitate in such a form that settling is rapid and removal can be accomplished easily by filtration, decantation, or other means. The rate required for addition of the ammonia throughout the critical range is so slow that the production rate of the equipment would be low if the same rate were used throughout the entire neutralization of the acid. This problem is avoided, however, by adding the ammonia at a relatively high rate up until the critical pH range and also beyond the critical pH range up to a final pH of about 6.0 to 6.6, which is the level desired in liquid fertilizers. It is therefore obvious, of course, that such control of ammoniation rate in this particular form of the process requires batch operation and that it is not applicable to continuous operation. Thus, after the wet-process phosphoric acid in reactor 2 has been thoroughly ammoniated it is led via line 4 to separation apparatus 5 from which the coproduct is withdrawn as filter cake via line 6 and the desired product of a clear solution of ammoniated wet-process acid is withdrawn via line 7.

Figure 2:
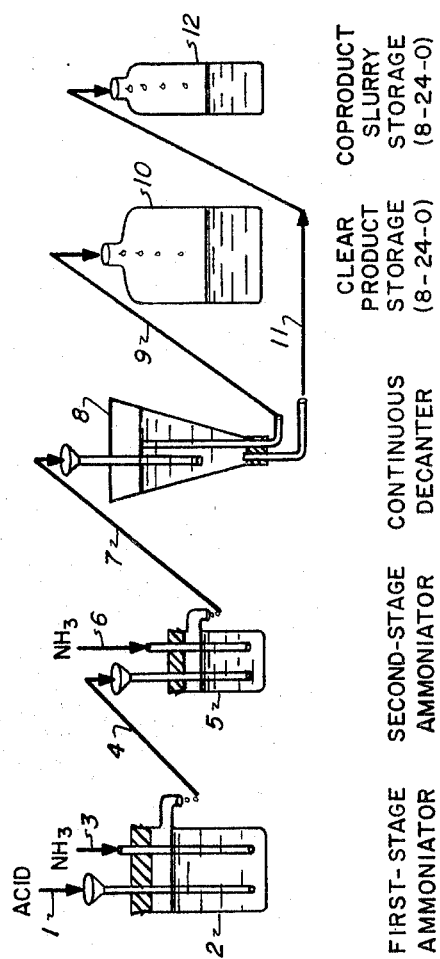
FIGURE 2 is a flowsheet generally illustrating the principles of our process which results in a liquid mixed fertilizer having the novel properties mentioned above prepared by continuous ammoniation and decantation.

Referring now more particularly to FIGURE 2, wet-process phosphoric acid from a source not shown is fed via line 1 into first-stage ammoniator 2. Ammonia from a source not shown is fed via line 3 into first-stage ammoniator 2 at a rate such that the pH of the acid being neutralized is continuously maintained at an optimum pH of 4.0 to 4.2. The overflow from first-stage ammoniator 2 is led via line 4 into second-stage ammoniator 5 wherein the partially neutralized acid is further ammoniated by ammonia from a source not shown via line 6 to the desired final pH of 6.0 to 6.6. The overflow from second-stage ammoniator 5 is fed via means of line 7 into the continuous decanter means generally illustrated as 8, with the overflow therefrom led via line 9 to storage vessel 10, and the underflow therefrom led via line 11 to coproduct slurry storage vessel 12.

U.S. Patent 2,792,286 describes a continuous ammoniation process for preparing ammonium phosphates and suggests ammoniating in two stages with clarification by filtration after the first or second stage; thus, two-stage ammoniation of wet-process acid described herein is not new. Process conditions have been outlined in detail in this description to assure a slurry that will have the proper settling characteristics. The new and unique process claimed is the continuous decantation of the ammoniated acid.

The feed into the decanter should be introduced where the ratio of volume above the inlet to volume below the inlet is the same as the volume ratio of product to coproduct. The use of an inverted cone-type decanter is advantageous because the rate of product flow upward decreases as it approaches the overflow point and thereby promotes settling; also, the thick slurry coproduct accumulates in the apex of the cone for easy removal.

If the liquid fertilizer and a solid fertilizer (such as ammonium phosphates) were produced in the same plant, settled slurry could be added to the solid fertilizer process stream at a suitable point. For instance, in an ammonium phosphate plant it could be added to the slurry before granulation. The grade of the slurry (dry basis) is near enough to ammonium phosphate fertilizer grades that a moderate proportion of it could be added without precluding the production of common ammonium phosphate grades. Alternately, the slurry product could be dried and marketed separately as a nonburning fertilizer or as a material for use in solid mixed fertilizer. The slurry product could be marketed also as a suspension fertilizer or used as an ingredient of suspension fertilizer. Pilot-plant tests indicated that the slurry could be pumped and sprayed satisfactorily.

In work on ammoniation of wet-process phosphoric acid and separation of precipitated impurities, it was found that settling rates correlated with filtration rates as indicated below.

| Average filtration rate, gal./hr./sq. ft. | Settling rate of precipitated solids, percent clear solution in 1 hr. |
|---|---|
| 305 | 75 |
| 167 | 57 |
| 108 | 30 |
| 31 | 14 |
| 26 | 10 |

Continuously ammoniated slurries with filtration rates of about 300 gallons per hour per square foot and settling rates of 75 percent clear solution in an hour could be decanted satisfactorily as described herein. Continuous decantation of slurries produced by batchwise ammoniation was not tried, but there is reason to believe that such slurries could be decanted if the settling (or filtration) rates were sufficiently high. Conditions were identified which resulted in production of slurry with high filtration rates (300–1500 gal./hr./sq. ft.) by batchwise ammoniation.

In work on continuous ammoniation, filtration after the first ammoniation stage at a pH of about 4.0 to 4.2 resulted in considerably higher filtration rates than those obtained when filtration was carried out at the desired final pH of about 6. Further ammoniation of solution filtered at pH 4.0 to 4.2 resulted in negligible amounts of precipitates. It therefore should be possible to decant the product from the first-stage ammoniator and then complete ammoniation of the two products in separate second stages. This should provide faster settling rates and a smaller decanter should be satisfactory. Alternately, the slurry product from such a decanter might be introduced into a solid ammonium phosphate fertilizer process stream before ammoniation and thereby eliminate the need for one ammoniator.

Figure 3:
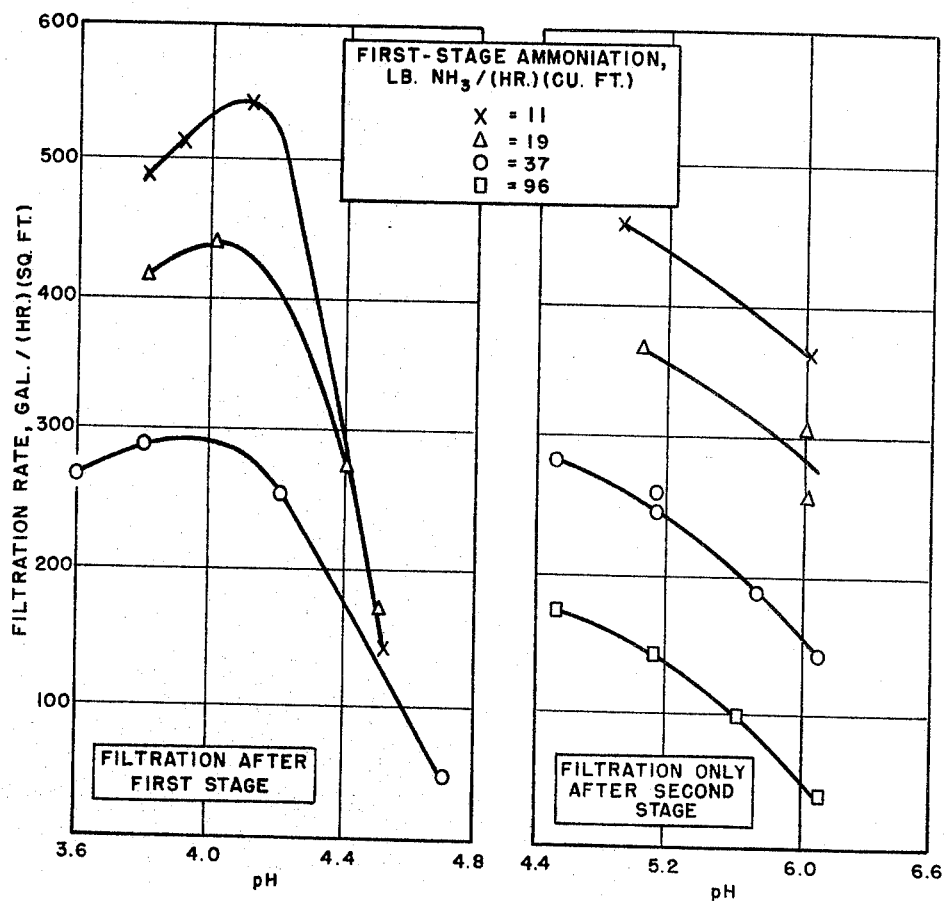
FIGURE 3 is a graphical illustration depicting the effects of rate of ammoniation and pH on filtration of continuously ammoniated filter-grade wet-process phosphoric acid by the continuous ammoniation method.

Referring now more particularly to FIGURE 3, as noted above in the work on continuous ammoniation, the filtration after the ammoniation step at a pH of about 4.0 to 4.2 resulted in considerably higher filtration rates than those obtained when filtration was carried out on material continuously ammoniated rapidly at the desired final pH of about 6.0, and this is shown graphically in the subject figure.

In order that those skilled in the art may better understand how the present invention can be practiced, the following examples of processes which we have used and the steps of producing liquid mixed fertilizers from the ammoniation of wet-process phosphoric acid by means of an improved process which gives the optimum in highest rates of filtration of ammoniated phosphoric acid and the highest rates of settling of the precipitated impurities therefrom are given by way of illustration and not by way of limitation.

*Example I*

The results of several experiments indicate that increasing the rate of ammoniation beyond 2 pounds per hour per cubic foot in the critical pH range reduces filtration rate substantially and that pH 2.7 as the lower extreme of the range gives better results than 3.1. Although completion of the ammoniation to pH 6.4 produced very little additional precipitate, filtering rate was reduced by about half as compared to filtering immediately after precipitation was complete (at end of critical range). Presumably, the further ammoniation caused breakup of aggregates.

The data obtained in this series of tests are for merchant-grade acid diluted to 26 per cent $P_2O_5$ and batch-successive ammoniation. Experiments with filter-grade acids gave similar results; however, the greater amount of impurities in filter-grade acid resulted in correspondingly slower filtration rates. Also, experiments with batch-simultaneous ammoniation gave results comparable to these data.

The results of the data obtained in this series of tests from merchant-grade acid diluted to 26 per cent $P_2O_5$ and batch-successive ammoniation are given in the following Table I.

TABLE I.—EFFECT OF RATE OF AMMONIATION DURING PRECIPITATION PERIOD ON FILTERING RATES OF BATCH-AMMONIATED MERCHANT-GRADE WET-PROCESS PHOSPHORIC ACID [a]

| Test No. | Slow ammoniation period [b] [c] | | | Filtration rates,[d] gal./(hr.)(sq. ft.) | |
|---|---|---|---|---|---|
| | pH range | Ammoniation rate, lb./(hr.)(cu. ft.) | Time, min. | At pH | |
| | | | | 4.15 | 6.4 |
| 1 | 2.7–4.15 | 2 | 41 | 1,471 | 855 |
| 2 | 2.7–4.15 | 5 | 23 | 1,042 | 536 |
| 3 | 2.7–4.15 | 8 | 10 | 554 | 260 |
| 4 | 2.7–4.15 | 12 | 8 | 404 | 105 |
| 5 | 3.1–4.15 | 3 | 19 | 815 | 458 |
| 6 | 3.1–4.15 | 6 | 12 | 675 | 322 |
| 7 | 3.1–4.15 | 8 | 7 | 434 | 130 |
| 8 | 3.3–4.15 | 2 | 17 | 442 | 118 |
| 9 | 3.3–4.15 | 3 | 14 | 265 | 75 |

[a] Acid (26% $P_2O_5$) preheated to 150° F. Volume per batch was 1,344 milliliters. Batch-successive procedure.
[b] Precipitation began at about pH 2.9.
[c] Ammoniation rates outside the "critical range" varied and went as high as 50 pounds per hour per cubic foot.
[d] Batches of 250 milliliters were filtered with C.H. House No. 1846 wool in 4½-inch diameter Buchner funnel filters at 20 to 26 inches of mercury vacuum.

*Example II*

Where dilution of acid is necessary the water may be charged to the reactor first. In batch-successive ammoniation this procedure has the advantage of retaining the heat of dilution; in batch-simultaneous ammoniation there are 2 advantages—the heat of dilution is retained and the ammoniating solution gradually changes from neutral to acid with a $P_2O_5$ content of about 26 per cent.

Data for experiments in which dilution water was charged to the reactor prior to batch-simultaneous ammoniation are given in Table II, infra. The amount of water necessary to reduce the $P_2O_5$ concentration to 26 per cent was placed in the reactor before introducing the acid and ammonia. The pH was held between 2.3 and 2.9 until all the acid had been fed. After adjusting the pH to 2.8, the rate of ammonia addition was controlled closely at about 2 pounds per hour per cubic foot until a pH of about 4.15 was reached. The rate was then raised and held at a high level until the remainder of the ammonia necessary to give the desired final pH was fed.

TABLE II

| | Grade of acid | |
|---|---|---|
| | Merchant | Filter |
| "Heel" of water in reactor, lb | 3.7 | 0.5 |
| Simultaneous feed of acid and ammonia: | | |
| Acid concentration, percent $P_2O_5$ | 53.7 | 27.9 |
| Acid rate, gal./hr | 0.89 | 0.89 |
| pH range | 2.3–2.9 | 2.3–2.8 |
| Duration, min | 17.5 | 42.8 |
| Ammonia rate, lb. $NH_3$/hr./cu. ft | 11–18 | 4–11 |
| Precipitation of acid impurities: | | |
| pH range | 2.9–4.15 | 2.8–4.0 |
| Ammonia rate, lb. $NH_3$/hr./cu. ft | 1.4–2.9 | 1–4 |
| Temperature of slurry, °F | 210–218 | 212–220 |
| Duration, min | 48 | 80 |
| Filtration rates of slurry, gal./hr./sq. ft.: | | |
| pH 4.4 (merchant grade) and 4.0 (filter grade) | 1,326 | 567 |
| pH 6.4 (merchant grade) and 6.0 filter grade) | 688 | 289 |

In conclusion, the effect of adding the dilution water to the reactor may be greater for batch-simultaneous than for batch-successive ammoniation. With batch-simultaneous ammoniation, the effective acid concentration gradually increased from 0 to about 26 per cent $P_2O_5$, whereas, with batch-successive ammoniation the effective acid concentration would begin and remain at about 26 per cent $P_2O_5$. The indications are that faster filtration is obtained with more dilute acid.

*Example III.—Continuous Ammoniation and Decantation*

Wet-process phosphoric acid containing 26 per cent $P_2O_5$ was ammoniated in two stages to a pH of 6.2. The resulting hot slurry was introduced into the decanter at a point above which the liquid volume was 75 per cent of the working volume. The continuous decanter had a working volume equal to the amount of feed per hour. The movement from the feed point toward the overflow was slow enough to allow settling of solids to the apex of the inverted cone. The overflow from the continuous decanter, 75 percent of the feed volume, was a clear liquid fertilizer with a chemical analysis of 8.3 percent nitrogen and 24.9 percent $P_2O_5$ and a density of 10.8 pounds per gallon. The thick slurry coproduct, 25 percent of the feed volume, had a chemical analysis of 8.1 percent nitrogen and 25.3 percent $P_2O_5$ and a density of 12.1 pounds per gallon. The operating conditions and results of this example are found in the following Table III.

TABLE III.—DECANTATION PROCESS FOR PRODUCTION OF CLEAR LIQUID FERTILIZER FROM WET-PROCESS PHOSPHORIC ACID AND AMMONIA (OPERATING CONDITIONS AND RESULTS)

First-stage ammoniation:
- Feed rate of 26% $P_2O_5$ acid, lb./hr. _____ 13.7
- Volume of ammoniator, gal. _____ 0.4
- Operating pH _____ 4.1
- Temperature, °F. _____ 218
- Ammoniation rate, lb. $NH_3$/(hr.)(cu. ft.) ____ 15

Second-stage ammoniation:
- Volume of ammoniator, gal. _____ 0.1
- Operating pH _____ 6.2
- Temperature, °F. _____ 216
- Ammoniation rate, lb. $NH_3$/(hr.)(cu. ft.) ____ 30

Decantation of slurry product:
- Volume of liquid in decanter, gal. _____ 1.4
- Volume above feed inlet, percent of total ____ 75
- Clear product from top:
  - Lb./hr. _____ 10.6
  - Percent of product volume _____ 75
- Thick slurry product from bottom:
  - Lb./hr. _____ 3.9
  - Percent of product volume _____ 25

Products:
- Clear liquor—
  - N, percent _____ 8.3
  - $P_2O_5$, percent _____ 24.9
  - Density, lb./gal. _____ 10.8
- Thick slurry—
  - N, percent _____ 8.1
  - $P_2O_5$, percent _____ 25.3
  - Density, lb./gal. _____ 12.1

While we have shown and described particular embodiments of our invention, modifications and variations thereof will occur to those skilled in the art. We wish it to be understood therefore that the appended claims are intended to cover such modifications which are within the true scope and spirit of our invention.

What we claim as new and desire to secure by Letters Patent of the United States is:

1. In a process for the production of fertilizer from wet-process phosphoric acid and the batch ammoniation thereof comprising the steps of adjusting the concentration of said wet-process phosphoric acid to the range of about 20 to 28 percent $P_2O_5$; introducing ammonia into said acid; raising the temperature of the acid solution to about its boiling point before rapid precipitation of congeneric impurities in said wet-process phosphoric acid occurs; discontinuing introduction of ammonia when the pH of the resulting suspension is in the range from about 6.0 to 6.6; and separating the resulting easily separable precipitate from the solution without strong agitation, the improvement therein which comprises introducing said ammonia to said acid at a relatively high rate in the range from about 15 pounds to about 50 pounds of ammonia per hour per cubic foot of acid solution until the pH of said acid is about 2.8; subsequently introducing ammonia into said acid at a relatively low rate in a range from about 2 pounds to about 5 pounds per hour per cubic foot of acid solution until the pH of the acid reaches about 4.2, said introduction of ammonia at said relatively low rate causing the formation of a granular, easily separable precipitate, which precipitate is separated from said acid solution in a later-mentioned separation step; subsequently adding the remaining ammonia at a relatively high rate in the range from about 15 pounds to about 50 pounds of ammonia per hour per cubic foot of acid solution to said acid solution during the final adjustment of pH from about 4.2 to the range of about 6.0 to 6.6; and subsequently separating the resulting granular, easily separable precipitate from said acid solution, said solution, after removal of said precipitate, being the clear liquid fertilizer product.

2. The process of claim 1 wherein the concentration of the wet-process phosphoric acid is adjusted to the range from about 24 to 28 percent $P_2O_5$.

3. The process of claim 1 wherein said process is carried out by means of a batch-simultaneous ammoniation in which the acid of proper concentration is fed simultaneously with ammonia at a controlled pH of about 2.5 until all of the acid required is introduced.

References Cited by the Examiner

UNITED STATES PATENTS

| | | | |
|---|---|---|---|
| 2,707,676 | 5/1955 | Picot et al. | 71—43 |
| 2,726,949 | 12/1955 | Andres et al. | 71—43 |
| 2,792,286 | 5/1957 | Wordie et al. | 71—41 |
| 2,891,856 | 6/1959 | Getsinger et al. | 71—41 |
| 2,913,329 | 11/1959 | Geiersberger et al. | 71—43 |

DONALL H. SYLVESTER, *Primary Examiner.*

ANTHONY SCIAMANNA, T. D. KILEY,
*Assistant Examiners.*